United States Patent
LeBlanc et al.

(10) Patent No.: US 6,946,764 B2
(45) Date of Patent: Sep. 20, 2005

(54) CONICAL HYBRID FDB MOTOR

(75) Inventors: Jeffry Arnold LeBlanc, Aptos, CA (US); Alan Lyndon Grantz, Aptos, CA (US); Troy Michael Herndon, San Jose, CA (US); Michael David Kennedy, Boulder Creek, CA (US); Robert Alan Nottingham, Santa Cruz, CA (US); Anthony Joseph Aiello, Aptos, CA (US); Klaus Dieter Kloeppel, Watsonville, CA (US); Paco Flores, Felton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/328,276

(22) Filed: Dec. 23, 2002

(65) Prior Publication Data

US 2004/0119353 A1 Jun. 24, 2004

(51) Int. Cl.$^7$ ................................................. H02K 5/16
(52) U.S. Cl. ........................................ 310/90; 310/90.5
(58) Field of Search ................... 310/90, 90.5; 384/100, 384/112, 110

(56) References Cited

U.S. PATENT DOCUMENTS

| | | | | |
|---|---|---|---|---|
| 5,427,456 A | * | 6/1995 | Hensel | 384/112 |
| 5,504,637 A | | 4/1996 | Asada et al. | 360/98.07 |
| 5,561,335 A | * | 10/1996 | Dunfield et al. | 310/90.5 |
| 5,763,967 A | * | 6/1998 | Kurosawa et al. | 310/45 |
| 5,977,674 A | * | 11/1999 | Leuthold et al. | 310/90 |
| 6,404,087 B1 | | 6/2002 | Ichiyama | 310/90 |
| 6,456,458 B1 | | 9/2002 | Ichiyama | 360/99.08 |
| 6,493,181 B1 | * | 12/2002 | Ichiyama | 360/99.08 |

FOREIGN PATENT DOCUMENTS

JP      06-315242    * 8/1994      H02K/7/08

* cited by examiner

Primary Examiner—Darren Schuberg
Assistant Examiner—Nguyen Hanh
(74) Attorney, Agent, or Firm—Morrison & Foerster LLP

(57) ABSTRACT

A disc drive design comprising a shaft and sleeve supported for relative rotation by a journal type fluid dynamic bearing utilizing grooves on one of the shaft or sleeve surfaces. At least a part of the shaft is generally conical in cross-section, so that a downward force component is developed to balance upward pressure on end of shaft; this conical region typically includes a fluid dynamic bearing (grooves being on either the shaft or sleeve). A grooved pattern of a design similar to that usually found on a thrust plate may be defined on an axial end surface of the shaft or the counterplate facing the axial end of the shaft, so that thrust is created to maintain separation of the end of the shaft and the facing counterplate plate during relative rotation. A diamond-like coating (DLC) may be applied to the counterplate surface or to the end of the shaft; further, either the counterplate or shaft may be made out of ceramic material to enhance this performance. This coating may also be applied to the conical surface of the shaft or the facing surface of the sleeve.

21 Claims, 6 Drawing Sheets

CONICAL HYBRID FDB MOTOR

CROSS REFERENCE TO A RELATED APPLICATION

This application claims priority to a provisional application Ser. No. 60/342,681 filed Dec. 20, 2001, in the names of Anthony Joseph Aiello, Klaus Dieter Kloeppel and provisional application 60/424,212 filed Nov. 5, 2002, in the names of Jeffry Arnold LeBlanc, Alan Lyndon Grantz, Troy Michael Herndon, Michael David Kennedy, Robert Alan Nottingham, entitled Single Core FDB Motor for HDD Applications, which application is incorporated herein by reference.

FIELD OF THE INVENTION

This invention relates to fluid dynamic bearing motors, and more particularly to such motors without thrust plate.

BACKGROUND OF THE INVENTION

Disc drive memory systems have been used in computers for many years as storage space for digital information. Information is recorded on concentric memory tracks of magnetic discs that rotate around a spindle. Information is accessed by read/write heads located on a pivoting arm which moves radially over the surface of the disc. The read/write heads (-transducers-) must be accurately aligned with the storage tracks on the disc to ensure proper reading and writing of information.

The discs are rotated at high speeds in an enclosed housing by means of an electric motor located inside the hub or below the discs. Such a motor is commonly known as a spindle motor. Such spindle motors typically have a spindle mounted by means of two ball bearing systems to a motor shaft in the hub. One of the bearings is located near the top of the spindle and the other near the bottom. These bearings allow for rotational movement between the shaft and the hub while maintaining accurate alignment of the spindle and the shaft. The bearings are normally lubricated by grease or oil.

The conventional bearing system described above is prone, however, to several shortcomings. First, vibration is generated by the balls rolling on the raceways. Ball bearings used in hard disk drive spindles run under conditions that often cause physical contact between raceways and balls in spite of the lubrication layer provided by the bearing oil or grease. Hence, ball bearings running on the apparently even and smooth, but microscopically uneven and rough, raceways transmit surface and circular imperfections in the form of vibration to the rotating disk. This vibration results in misalignment between the data tracks and the read/write transducer. These imperfections reduce the lifetime and effectiveness of the disc drive system.

Another problem is related to the use of hard disk drives in portable computer equipment and the resulting requirements for shock resistance. Shocks create relative acceleration between the disks and the drive casting. Since the contact surface in ball bearings is very small, the resulting contact pressures may exceed the yield strength of the bearing material and leave permanent deformation and damage on raceways and balls.

Moreover, mechanical bearings are not always scaleable to smaller dimensions. This is a significant drawback since the tendency in the disc drive industry has been to continually shrink the physical dimensions of the disc drive unit, as well as operate the units at ever-increasing speeds.

Another problem is that of potential leakage of grease or oil into the atmosphere of the disc drive, or outgassing of the components into this atmosphere. Because of the extremely high tolerance required for smaller radial spacing between tracks on the disc and the gap in the transducer which is used to read and write data on the disc, discs are located within sealed housings in which contaminants cannot be tolerated.

As an alternative to conventional ball bearing spindle systems, hydrodynamic bearing spindle systems have been developed. In these types of systems, lubricating fluid (gas or liquid) functions as the bearing surface between a stationary base housing and the rotating spindle/hub. For example, liquid lubricants including oil, more complex ferro-magnetic fluids, or even air have been utilized in hydrodynamic bearing systems. Air is popular because it is important to avoid the outgassing of contaminants into the sealed area of the head disc housing. However, air cannot provide the lubricating qualities of oil or the load capacity. Its low viscosity requires smaller bearing gaps and therefore higher tolerance standards to achieve similar dynamic performance. The liquid lubricant must be sealed within the bearing to avoid a loss which would result in reduced bearing load capacity and life. Otherwise, the physical surfaces of the spindle and of the housing would come into contact with one another leading to accelerated wear and eventual failure of the bearing system.

In the prior art, seals for containing the fluid within the disc drive utilize a pressurized film on the surface of the liquid-air interface, or surface tension. In the case of bearing assemblies which employ ferro-magnetic fluids, the seal is achieved by means of a magnetic field established at each end of the bearing.

A shortcoming of known hydrodynamic bearings includes the fact that many prior art hydrodynamic bearing assemblies require large or bulky structural elements for supporting the axial and radial loads, as many hydrodynamic bearings do not have the inherent stiffness of mechanical bearing assemblies. It is difficult to scale the structural support elements to fit within the smaller disc drive dimensions currently in demand. In other instances, hydrodynamic bearing assemblies require extremely tight clearances and precise alignments. This burden makes it difficult to manufacture such assemblies since even a small deviation or aberration can lead to faulty bearings. Further, as the gaps in which the fluid is located become smaller, the power consumed to rotate the spinning elements increases.

Another consideration is that the data track density on hard discs has been decreasing, and track mis-registration, commonly known as TMR, is becoming increasingly critical. One of the primary contributors to TMR is disc spindle runout. It consists of both repeatable runout and non-repeatable runout, commonly referred to as NRRO. The NRRO of a ball bearing motor is often too high for today's disc drives. However, fluid dynamic bearings (FDB) provide a much lower NRRO, which better supports the high aerial data densities of current disc drive technology.

The architecture of fluid dynamic spindles in the past has generally included a shaft in a housing, which provides radial stiffness, and a thrust bearing, which controls the vertical position of the spindle. Both the shaft and thrust bearing have generally been cushioned by a fluid film. The journal and shaft surfaces have typically been provided with miniature grooves, which create pressure by directing the fluid into specific areas of the journal.

One problem with this conventional FDB spindle motor arrangement is that it limits the degree to which the height of the motor assembly may be reduced. This is because the thickness of the thrust bearing must be added to the length of the shaft, which itself must be of a length sufficient to provide rotational stability. Moreover, use of a thrust bearing increases the amount of drag the motor must overcome during operation, increasing power consumption.

In the field of fluid dynamic bearing motors for use in hard disc drives, some prior systems including, but not limited to, small form factor motor designs for mobile applications have been limited by stringent power requirements. In the traditional "single-plate" FDB design, a thrust plate with two equal and opposing thrust bearings is affixed to the journal bearing shaft to provide axial stiffness. This approach results in bear gaps at large diameters, thereby increasing bearing drag and overall motor power.

SUMMARY OF THE INVENTION

It is an objective of the invention to provide a hydrodynamic bearing which is simple and scalable in design, which diminishes the amount of power consumed during rotation while maintaining dynamic performance under operating vibration conditions.

It is another objective of the invention to diminish the power losses or power consumption associated with use of the thrust plate mounted on a shaft.

It is a related objective of the invention to provide a reduction in the overall height of the motor by elimination of the thrust plate.

Another objective of the invention is to reduce the drag and make the motor more efficient while permitting operation using lower power by elimination of the thrust plate.

Another objective of the invention is to provide a bearing design for use in a spindle motor which also is designed to prevent separation of the parts of the bearing when the motor is inverted or subjected to shock, even lacking a thrust plate.

Another objective in certain embodiments is to increase the journal span for angular response improvement.

These and other objectives of the invention are achieved in the design comprising a shaft and sleeve supported for relative rotation by a journal type fluid dynamic bearing utilizing grooves on one of the shaft or sleeve surfaces. At least a part of the shaft is generally conical in cross-section, so that a downward force component is developed to balance upward pressure on end of shaft; this conical region typically includes a fluid dynamic bearing (grooves being on either the shaft or sleeve).

In many embodiments a grooved pattern of a design similar to that usually found on a thrust plate is defined on an axially end surface of the shaft or the counterplate facing the axial end of the shaft, so that thrust is created to maintain separation of the end of the shaft and the facing counterplate plate during relative rotation.

In yet another alternative embodiment, to provide further robustness to the start/stop induced wear which is created by friction between the end of the shaft and the facing counterplate, a diamond-like coating (DLC) may be applied to the counterplate surface or to the end of the shaft; further, either the counterplate or shaft may be made out of ceramic material to enhance this performance. This coating may also be applied to the conical surface of the shaft or the facing surface of the sleeve.

Other features and advantages of the invention may be apparent to a person of skill in the art who studies the following description of preferred embodiments given with reference to the figures briefly described below.

In another embodiment, a recirculation or pressure equalization port is provided from the gap between shaft end and counterplate to a region between the conical bearing and journal bearing; this part provides means for equalizing pressure across the cone and/or provides means to eliminate air bubbles from fluid in the shaft end/counterplate gap.

DETAILED DESCRIPTION OF THE PREFERRED EMBODIMENTS

The following description of a preferred embodiment of the invention is given with reference to its use in a disc drive, since disc drives are especially directed to incorporating motors of a low profile. However, the present invention may also be useful in many other formats and environments.

Figure 1:
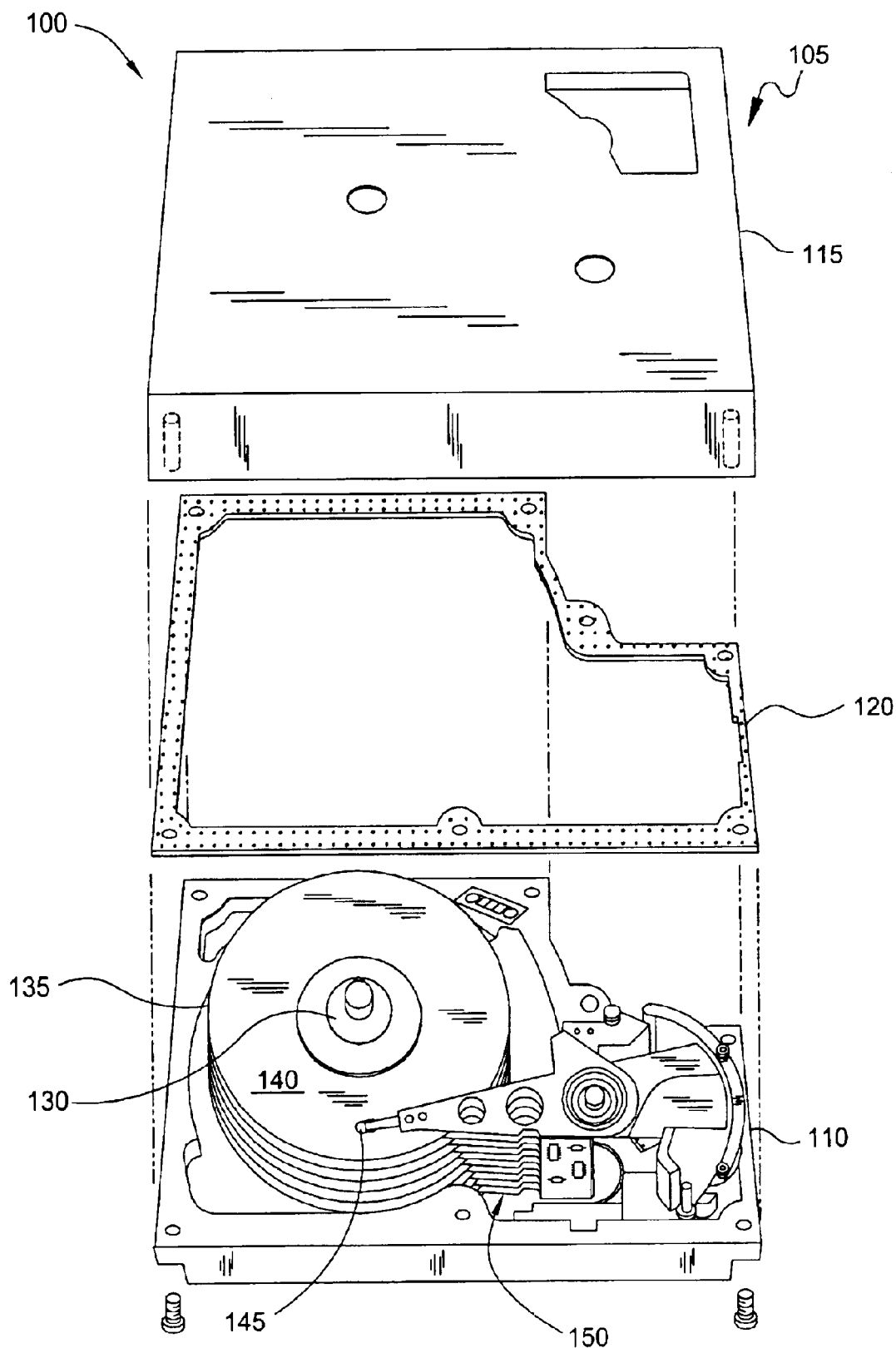
FIG. 1 is a perspective view of a disc drive in which the present design is useful.

Thus, as an exemplary environment for use in the present invention, FIG. 1 shows an exploded perspective view of a disc drive storage system in which the present bearing and motor would be useful. FIG. 1 is provided primarily to give an illustrative example of the environment in which a motor incorporating the bearing comprising the features of the present invention is used; clearly, the motor could be used equally well in other designs of disc drives, or other operating environments apart from disc drive technology where minimizing the start and run power for the motor, and/or minimizing the overall height of the motor is a desirable feature.

More particularly, in FIG. 1 the storage system 10 includes a housing 12 having a spindle motor 14 which rotatably carries the storage disc or discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a set of radially differentiated tracks on the surface of the discs 16. This allows the transducers to read and write encoded information on the surface of the discs at selected locations. The discs rotate at very high speed, several thousand rpm, in order to maintain each transducer flying over the surface of the associated disc. In present day technology, achieving the high speed of rotation and maintenance of that high speed while utilizing minimum power is a very important goal.

A common characteristic of the reduced power fluid dynamic bearing design of the invention is the provision of a fluid dynamic bearing (FDB) without the traditional thrust washer or plate, but rather comprising a grooved thrust bearing defined between the end of the shaft and the opposing counterplate, and an opposing means comprising at least one conical journal bearing for establishing a counter force in order to maintain the alignment of the relatively rotating parts in the system.

Figure 2:
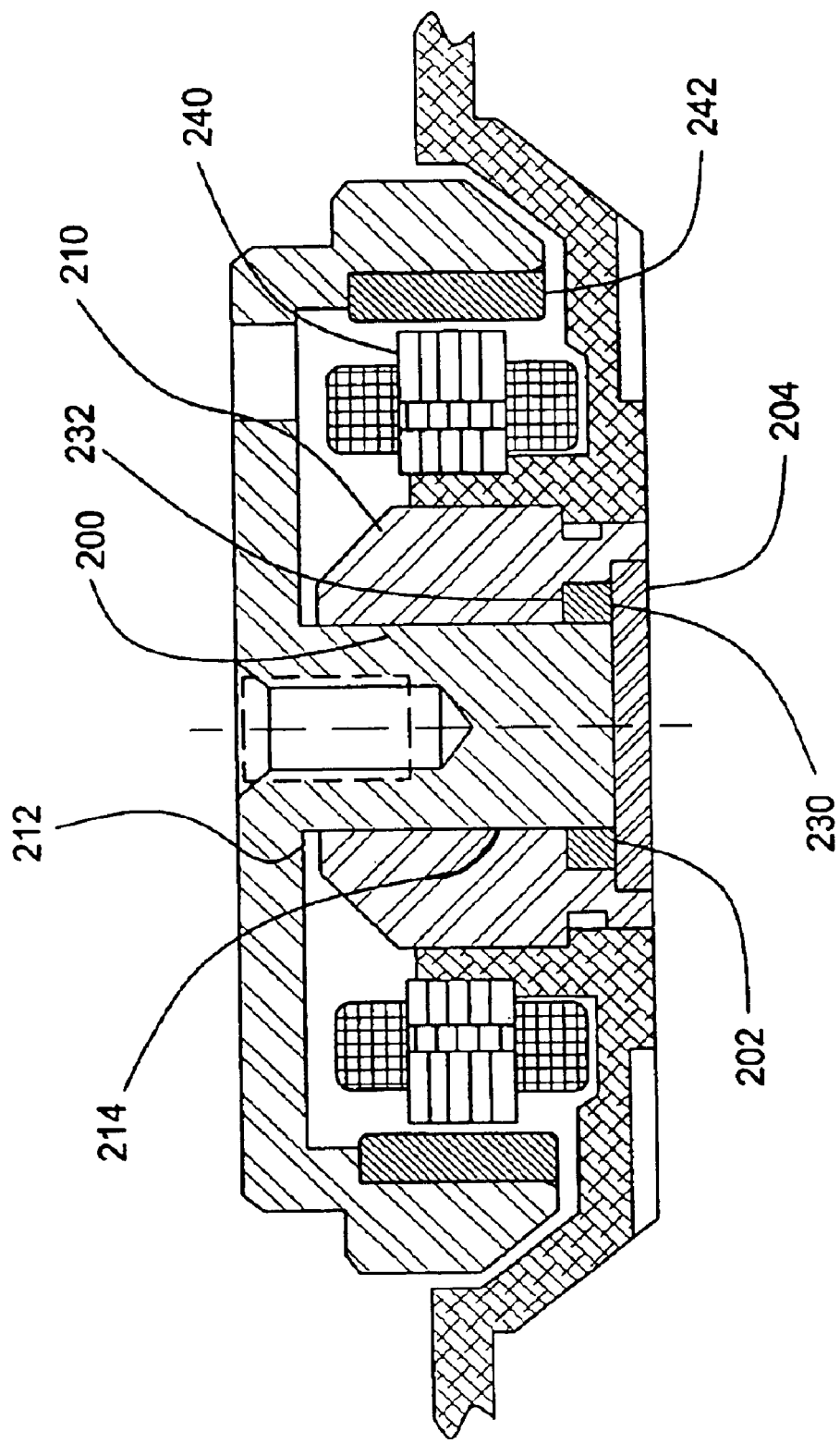
FIG. 2 illustrates the current single thrust plate design.

FIG. 2 illustrates the basic elements of a basic current technology single thrust plate design comprising a shaft 200 having a thrust plate 202 at an end thereof facing a counterplate 204. The shaft 200 and thrust plate 202 are supported for rotation relative to the sleeve 210 by a journal bearing 212 defined by grooves on one of the shaft 200 or sleeve 210 and fluid in the gap 214 between those two surfaces. The rotation of the shaft and thrust plate is further supported by thrust bearings defined between the axially facing surfaces 230, 232 of the thrust plate 202 and the facing surfaces of counter plate 204 and sleeve 210. Rotation of the shaft and thrust plate within the sleeve is established in accordance with well known principles by energization of the coils 240 of the stator in cooperation with the magnet 242.

Figure 3A:
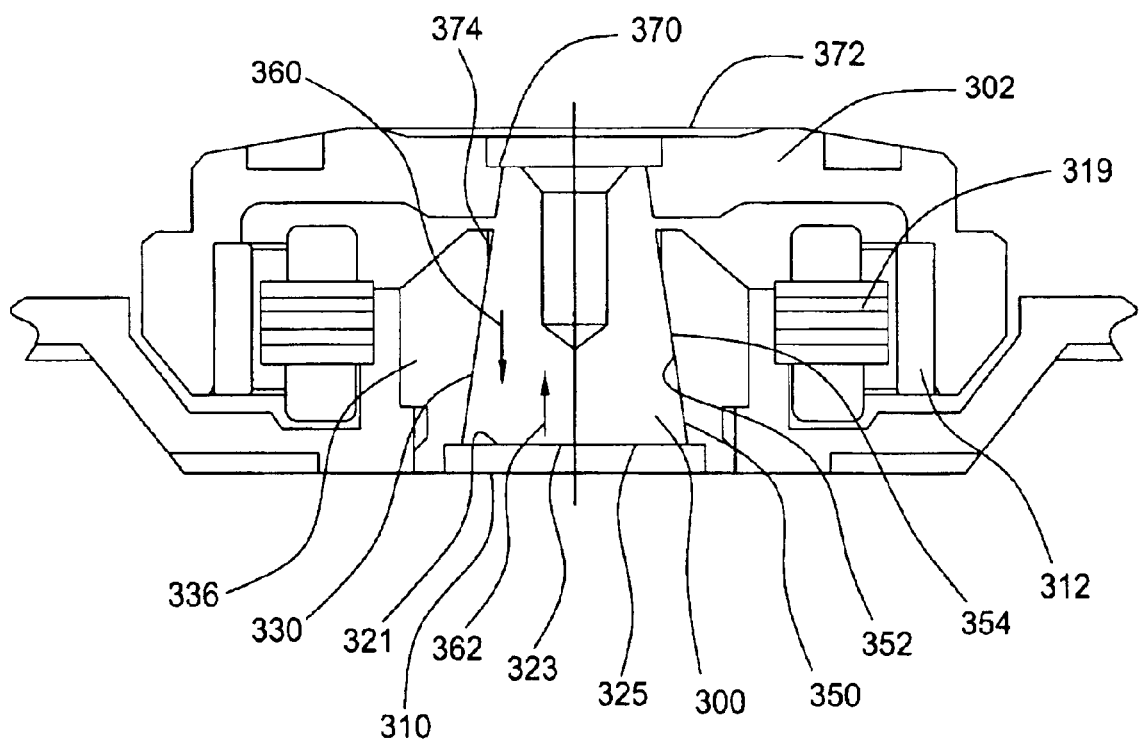
FIG. 3A illustrates an embodiment of the present invention.
Figure 3B:
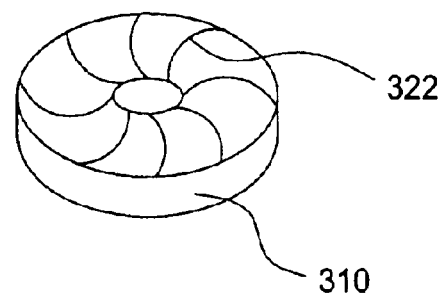
FIG. 3B illustrates one of several potential groove patterns useful on the surface of the counterplate 310 of FIG. A.

A first embodiment of the present invention can be found in FIG. 3A, with a particular feature, that is an example of the grooved design which is located between the shaft end and counterplate, i.e., on the base of the shaft facing the counter plate, base plate or equivalent, (or vice-versa, on the counterplate surface) to support relative rotation of the shaft and sleeve being shown in FIG. 3B.

FIG. 3A shows a rotating shaft 300 supporting a hub 302 for rotation with the shaft. The hub 302 is clearly adapted to support one or more discs (not shown) on the shoulder 304 for constant high speed rotation. This rotation is established by the stator 319 which is mounted from the base cooperating with the magnet 312 which is mounted from the inner surface of the hub 302.

It can be seen that the end face 321 of the shaft which is defined at the end of the conical cross-section is solid and faces upper surface 323 of counterplate 310. Either the base surface 321 of the shaft or the facing counterplate surface 323 includes a grooved pattern 322 thereon as shown for example in FIG. 3B. Fluid is introduced into this gap under the urging of the grooved pattern 322 when the shaft starts spinning from the gap 330 between the shaft 300 and the surrounding sleeve 336. This fluid is drawn into the shaft end and counter-plate thrust bearing region 325 to support relative rotation between the end of the shaft and the facing surface of the counterplate, the fluid being maintained in the gap 325 by the grooved pattern during rotation.

A journal bearing 354, as is well known in this technology is defined on the outer surface 350 of the shaft or the facing surface 352 of the sleeve utilizing the fluid in gap 330. This journal bearing 354 would have the dual function of supporting the shaft for rotation, and, if biased to accomplish this goal, could also tend to force fluid from the gap 330 toward the shaft/counterplate gap 325.

To this end, the journal bearing in the gap 330 could be defined with the grooves proportioned to create a downward bias toward the thrust bearing 340 at gap 325. This journal bearing 354 aids in moving fluid from the journal gap 330 toward the thrust gap 325 especially at start-up and maintains it during continuous running conditions. To prevent the shaft from being displaced axially too far from the counterplate, by the axially upward thrust bearing at gap 325 between the shaft end and counterplate, an opposing bias is typically introduced. This bias is utilized to prevent the gap 325 from becoming too large, which would reduce the effectiveness of the shaft thrust bearing at gap 325.

For this reason, the journal bearing defined on the conical cross-sectional surface 352 of shaft 300 is provided. This journal bearing, since it appears on a conically-tapered surface, will have a downward thrust component in the direction of arrow 360, which acts against the upward force component 362 which is generated by the relative rotation of the thrust bearing created by shaft end surface 321 and counterplate surface 323. The provision of this downward force keeps the system balanced for optimum gap widths and rotation. This groove pattern may also be biased to move fluid toward the shaft end.

It may be beneficial to also introduce an electromagnetic bias, as for example, by offsetting the magnet 312 relative to the stator 310 or by mounting small magnets on the upper surface of sleeve 336 facing a magnet on a lower surface of the hub 302 to introduce a means to bias the shaft either axially toward the counterplate or away from the counterplate upon landing when the operation of the motor ceases. As an additional feature, then a wear-tolerant surface such as DLC or the like would be introduced to establish a wear-tolerant landing zone. For example the inner surface 330 of sleeve 336 (or the outer surface of the conical shaft section) may have a wear tolerant layer if the bias is upward in the direction of the arrow 362. Upon landing, the rotating shaft would land and start up against a wear tolerant surface. A similar surface could be on the end of the shaft or the facing counterplate surface in which case an opposite bias needs to be established.

In the embodiment of FIG. 3A, at least a section 350 of the shaft 300 is tapered outwardly at its outer surface 350 and the inner surface 352 of sleeve 336 is also tapered to establish a fluid bearing gap 330. A groove pattern which may be of any type known in this field is defined on this tapered surface, and is of sufficient length to create an axial component of force downward toward the counterplate 310 to balance the upward force which is being exerted axially against the lower face 321 of shaft 300. The axial component of the fluid bearing defined along the conical surface 352 tends to drive the shaft down toward the counterplate in the direction of the arrow 360 thereby counteracting the force exerted against the surface 321 by the pumping action of the fluid bearing 322 which tends to drive the shaft axially up away from the counterplate in the direction of the arrow 362.

Figure 4:
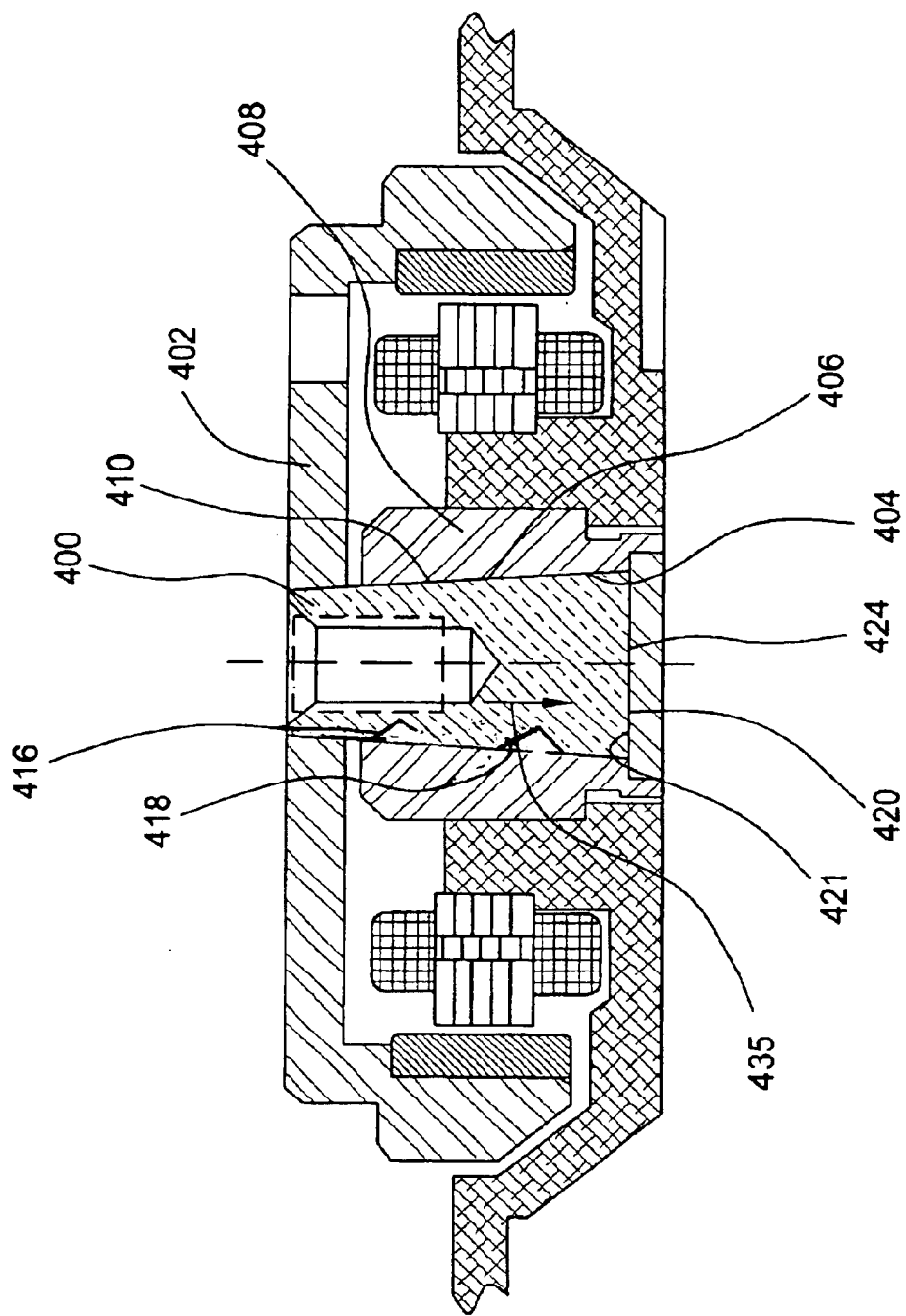
FIG. 4 embodiment with full-length conical shaft.

Yet another alternative appears in FIG. 4 in which the entire length of the shaft 400 with which the hub 402 is supported, is tapered as shown. This approach is potentially easier to manufacture because the entire outside surface 404 of shaft 400 can easily be tapered with a grinding process; the inner surface 406 of sleeve 408 could be prepared in a similar way to establish the gap 410 for the fluid bearing 412. In this design, grooves at least one or more groove sections 416, 418 are defined on the outer surface 404 of the shaft. Due to the angled surface of the journal a force is created which tends to drive the rotor comprising shaft 400 down toward the counterplate 420, thereby offsetting the upward biasing force against the surface 421 of the shaft 400. This upward bias is created by a grooved pattern on either the surface 421 on the bottom of the shaft 400 or, preferably, a similar pattern on the shaft facing surface 424 of counterplate 420. In a manner similar to the embodiment of FIG. 3, the groove patterns 416, 418 on the outer surface 404 of shaft 400 can be asymmetrical to establish an axially downward bias 430 toward counterplate 420.

Figure 5:
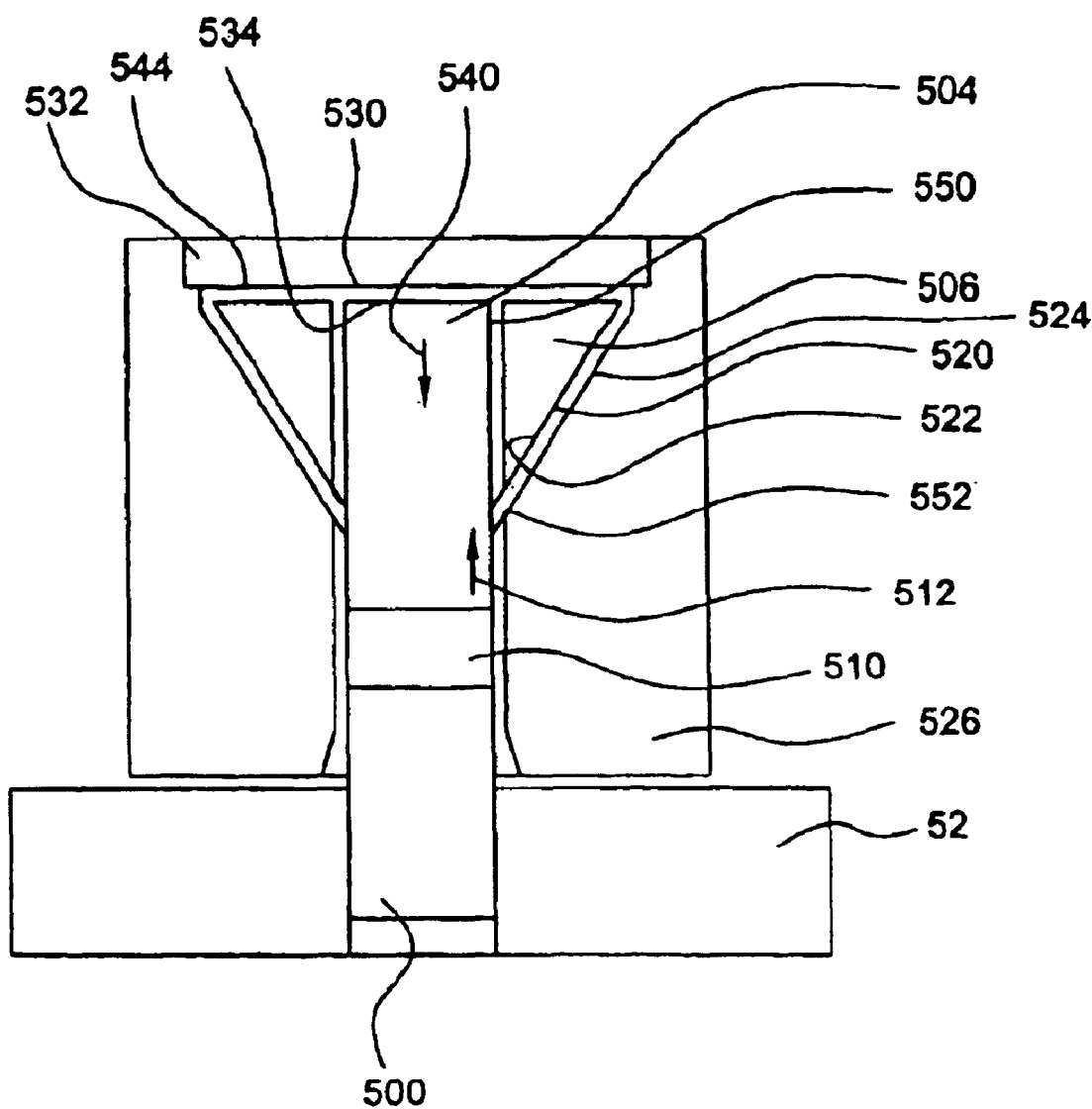
FIG. 5 illustrates a further alternative embodiment of the invention.

A further embodiment of the invention is shown in FIG. 5 which is a design including a fixed shaft 500 supported from a base 502. The distal end 504 of the shaft includes a cone 506 which may be either fastened to the shaft or integrally formed on the shaft. In this design, an asymmetric journal bearing 510 is provided which pumps fluid toward the conical end of the shaft. One of the two surfaces facing the conical gap 520, i.e., either the outer surface 522 of the conical region 506 or the facing surface 524 of the sleeve 526 also have grooves to support the rotation of the sleeve 526 about the fixed shaft 500.

The end of the bearing system distal from the asymmetric journal bearing includes a gap 530 defined between the counterplate 532 and the end surface 534 of the shaft 500 including conical bearing 506. The asymmetric bearing 510 can be established to pump with sufficient pressure through the continuous gap 520 which includes the journal bearing 510 and conical bearing 520 as well as the end gap 530 to provide a hydraulic pressure against the end of the shaft 534. If the asymmetric journal bearing 510 pumps with sufficient pressure, this asymmetry alone provides a sufficient hydraulic pressure and axial thrust in the direction of arrow 540 to set the bearing gap 530 and thereby the gap for the conical bearing 520 for this bearing to effectively operate in high-speed rotational operation.

Alternatively, the gap region 530 could include a groove pattern as shown in FIG. 3B and described with respect to FIGS. 3A and 3B. This would establish a thrust bearing to create axial force in the direction of arrow 540 that works either alone or in conjunction with the hydraulic force to set the bearing gap in the region of conical bearing 520.

In yet another embodiment, the end of the shaft read gap region 530 could include a thrust bearing where the gap 530 is potentially fairly large. In such a region, grooves would be provided on either end surface 534 of the shaft or the facing surface 544 of the counterplate which as the shaft begins to rotate would help initially lift the shaft by generating force in the direction of the arrow 540. But this force would diminish as the hydraulic force increases the gap with increasing speed, setting the conical gap but efficiently reducing the required running power for the motor.

Each of these embodiments utilizes a recirculation path 550 comprising one or more openings or ports extending from the gap 530 defined between counterplate 532 and its surface 544 and the facing surface 534 of the shaft end, and extending to a point between the conical bearing 520 and the journal bearing 510. This equalization path from gap 530 to 0.552 tends as its name implies to equalize the pressure at both ends of the gap, that is, the same pressure exists both above and below the cone. This tends to create a more stable operation for the overall system. The equalization path is defined simply by providing one or more generally axially directed openings 550 from the gap 530 to the junction 552.

Figure 6:
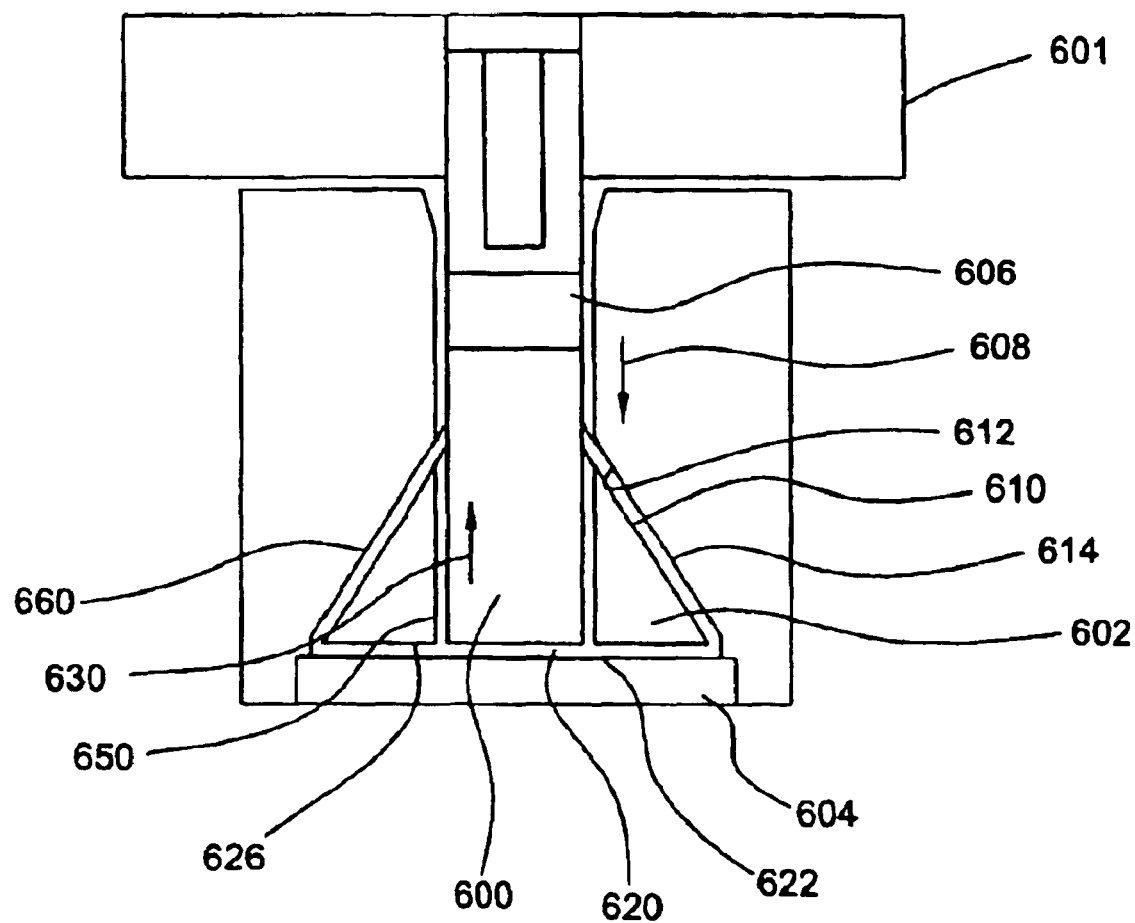
FIG. 6 illustrates yet another embodiment of the invention.

FIG. 6 shows an embodiment incorporating similar principals as applied to a rotating shaft design. In this design, the rotating shaft 600 supports a hub 601 at an end thereof and includes a cone 602 at an end adjacent the counterplate 604. The shaft 600 and cone 602 are supported for rotation by an asymmetric journal bearing 606 which pumps to create a pressure gradient in the direction of arrow 608 and a conical bearing 610 defined by grooves on one of the surfaces 612, 614 which face each other across the gap 610 and are defined in accordance with known principles. The fluid bearing system further comprises a gap 620 between an axially facing surface 622 of counterplate 604 and a cooperating surface 626 defined at an end of the shaft 600 and cone 602. This gap region may or may not include grooved features, depending upon the operating principles of the design as described above. That is, the journal bearing asymmetry can be defined to provide a hydraulic pressure against the end 626 of the shaft, with this pressure alone providing an axial thrust that sets the bearing gap for the conical bearing at gap 610. Alternatively, the end of the shaft would include a thrust bearing by defining grooves on one of the surfaces 622, 626 pumping toward the center of the shaft thereby providing an axial force in the direction of arrow 630 that works with the hydraulic force established by the asymmetric bearing to set the bearing gap for the conical bearing 610. Yet in another embodiment, the end of the shaft would include a thrust bearing with a potentially relatively large gap 620 such that the axial force would initially help lift the shaft off surface 626 off the facing counterplate surface 622; but the force would diminish as the hydraulic force increases the gap with increasing speed, thus reducing the running power of the motor. Each of these approaches would preferably utilize one or more equalization ports 650 which equalized the pressure between the gap 620 and the common region 660 between the conical bearing 610 and the journal bearing 606. These ports which simply comprise one or more openings connecting the two regions equalize the pressure at both ends of the opening functioning as the equivalent of a short circuit to get equal pressure above and below the cone to stabilize the cone.

Other features and advantages of this design may be apparent to a person of skill in the art who studies the above disclosure. Therefore, the scope of the invention is to be limited only by the following claims.

A further alternative to the above designs having a conical and cylindrical portion (e.g., as shown in FIGS. 3A, 5, and 6) includes having a conical bearing distal from the shaft end gap which serves as a thrust bearing. For example, a relatively large cylindrical portion adjacent the shaft end gap serving as a thrust bearing and a conical portion atop the cylindrical portion. Other variations will be apparent to those of ordinary skill in the art.

What is claimed:

1. A spindle motor for use in a disc drive comprising a shaft, the shaft having a first end and a second end that is larger in diameter than the first end, the shaft being disposed within a bore defined by an inner surface of a sleeve supported from a base or a hub, wherein the shaft further comprises a cylindrical portion and a conical portion within the sleeve, the hub being supported for rotation by either the shaft or the sleeve, the shaft and the sleeve being supported for relative rotation by a fluid dynamic journal bearing comprising fluid in a first gap between the shaft and the sleeve, the fluid dynamic journal bearing having asymmetrically proportioned grooves to pump the fluid toward the second end of the shaft, a counterplate having a grooved pattern thereon to maintain fluid in a second gap between the second end of the shaft and the first surface of the counterplate, the grooved pattern supporting the shaft for rotation relative to the counterplate and sleeve and providing a net pumping force inward toward an axial center of the counterplate.

2. A spindle motor for use in a disc drive as claimed in claim 1 wherein the second end of the shaft has a conical cross section.

3. A spindle motor for use in a disc drive as claimed in claim 2 wherein a conical bearing is supported on the second end of the shaft.

4. A spindle motor for use in a disc drive as claimed in claim 1 wherein a grooved pattern on the first surface of the counterplate is defined to pump inward toward an axial center of the shaft.

5. A spindle motor for use in a disc drive as claimed in claim 1 including a grooved pattern defined along an outer surface of the second end of the shaft.

6. A spindle motor for use in a disc drive as claimed in claim 1 further comprising a grooved pattern defined along the first gap between a section of the shaft axially inward of the second end and a facing surface of the sleeve to provide radial support for the shaft.

7. A spindle motor for use in a disc drive as claimed in claim 1 further comprising a wear-resistant surface on one of an outer surface of the second end of the shaft or a facing conical inner surface of the sleeve, the wear-resistant layer providing a region on which the surfaces may rest when the shaft and sleeve are at rest.

8. A spindle motor for use in a disc drive as claimed in claim 1 further comprising a wear-resistant surface layer on one of an end surface of the second end of the shaft or the facing first surface of the counterplate, the wear-resistant surface layer providing a resting surface for the shaft and counterplate when they are relatively at rest.

9. A spindle motor for use in a disc drive comprising a shaft, the shaft having a first end and a second end that is larger in diameter than the first end, the shaft being disposed within a bore defined by an inner surface of a sleeve supported from a base or a hub, wherein the shaft further comprises a cylindrical portion and a conical portion within the sleeve, the hub being supported for rotation by either the shaft or the sleeve, the shaft and the sleeve being supported for relative rotation by a fluid dynamic journal bearing comprising fluid in a first gap between the shaft and the sleeve, the fluid dynamic journal bearing having asymmetrically proportioned grooves to pump the fluid toward the second end of the shaft, a counterplate having a first surface facing the second end of the shaft, the counter plate being supported from one of the base or the hub, and means for supporting the shaft and the counterplate and sleeve for relative rotation.

10. A fluid dynamic bearing comprising a shaft, the shaft having a first end and a second end, the second end larger in diameter than the first end, the shaft being disposed within a sleeve supported from one of a base or a hub, the hub being supported for rotation by either the shaft or the sleeve, wherein the shaft further comprises a cylindrical portion and a conical portion within the sleeve, a counterplate having a first surface facing the second end of the shaft, the counter plate being supported by the one of the base or the hub, the shaft and the sleeve being supported for relative rotation by a journal bearing comprising fluid in a first gap between the shaft and sleeve, the journal bearing comprising an asymmetrically proportioned grooved pattern formed on one of the shaft or the sleeve and biased to pump the fluid toward the counterplate, one of the second end of the shaft or the first surface of the counterplate having a grooved pattern thereon to maintain fluid in a second gap defined therebetween, thereby supporting the shaft and the sleeve and counterplate for relative rotation.

11. A fluid dynamic bearing as claimed in claim 10 wherein the second end of the shaft has a conical cross section.

12. A fluid dynamic bearing as claimed in claim 11 wherein a conical bearing is supported on the second end of the shaft.

13. A fluid dynamic bearing as claimed in claim 10 including a grooved pattern defined along an outer surface of the second end of the shaft.

14. A fluid dynamic bearing as claimed in claim 10 further comprising a grooved pattern defined along the first gap between a section of the shaft axially inward of the second end and a facing surface of the sleeve to provide radial support for the shaft.

15. A fluid dynamic bearing as claimed in claim 10 further comprising a wear-resistant surface on one of the conical portion of the shaft or a facing conical inner surface of the sleeve, the wear-resistant layer providing a region on which the surfaces may rest when the shaft and sleeve are at rest.

16. A fluid dynamic bearing as claimed in claim 15 including means for establishing an electromagnetic bias between the sleeve and the hub so that the shaft rests on a selected surface of the sleeve.

17. A fluid dynamic bearing as claimed in claim 10 further comprising a wear-resistant surface layer on one of an end surface of the second end of the shaft or the facing first surface of the counterplate, the wear-resistant surface layer providing a resting surface for the shaft and counterplate when they are relatively at rest.

18. A fluid dynamic bearing as claimed in claim 10, wherein the journal bearing is formed on the shaft or the sleeve corresponding to the cylindrical portion of the shaft.

19. A fluid dynamic bearing as claimed in claim 10, wherein the journal bearing is formed on the shaft or the sleeve corresponding to the conical portion of the shaft.

20. A fluid dynamic bearing as claimed in claim 10, wherein a grooved pattern on the first surface of the counterplate or the second end of the shaft is defined to pump inward toward an axial center of the shaft.

21. A fluid dynamic bearing as claimed in claim 10, further comprising a wear-resistant surface on at least a portion of the conical portion of the shaft.

* * * * *